US008373698B2

(12) United States Patent
Dillenberger et al.

(10) Patent No.: US 8,373,698 B2
(45) Date of Patent: Feb. 12, 2013

(54) HOLOGRAPHIC ENTERPRISE NETWORK

(75) Inventors: Donna N. Dillenberger, Yorktown Heights, NY (US); Michael J. Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 11/747,147

(22) Filed: May 10, 2007

(65) Prior Publication Data
US 2008/0282004 A1 Nov. 13, 2008

(51) Int. Cl.
G06T 15/00 (2011.01)
G06T 17/00 (2006.01)

(52) U.S. Cl. ........................................ 345/419; 345/420

(58) Field of Classification Search .................. None
See application file for complete search history.

(56) References Cited

U.S. PATENT DOCUMENTS

| | | | |
|---|---|---|---|
| 5,353,399 A | 10/1994 | Kuwamoto et al. | |
| 5,781,229 A * | 7/1998 | Zediker et al. ............. | 348/51 |
| 5,884,029 A | 3/1999 | Brush, II et al. | |
| 5,958,012 A | 9/1999 | Battat et al. | |
| 5,999,208 A | 12/1999 | McNerney et al. | |
| 6,054,987 A | 4/2000 | Richardson | |
| 6,112,015 A | 8/2000 | Planas et al. | |
| 6,195,184 B1 * | 2/2001 | Chao et al. ............. | 359/32 |
| 6,271,845 B1 | 8/2001 | Richardson | |
| 6,289,380 B1 | 9/2001 | Battat et al. | |
| 6,404,437 B1 | 6/2002 | Russell, II et al. | |
| 6,456,306 B1 | 9/2002 | Chin et al. | |
| 6,633,312 B1 | 10/2003 | Rochford et al. | |
| 6,809,738 B2 | 10/2004 | Hubrecht et al. | |
| 6,970,919 B1 | 11/2005 | Doi et al. | |
| 7,012,602 B2 | 3/2006 | Watson et al. | |
| 7,055,107 B1 | 5/2006 | Rappaport et al. | |
| 7,065,584 B1 | 6/2006 | Shavitt et al. | |
| 7,073,129 B1 | 7/2006 | Robarts et al. | |
| 7,197,193 B2 | 3/2007 | Li et al. | |
| 7,319,992 B2 | 1/2008 | Gaos | |
| 7,336,383 B2 | 2/2008 | Kageyama | |
| 7,379,999 B1 | 5/2008 | Zhou et al. | |
| 7,386,628 B1 | 6/2008 | Hansell et al. | |
| 7,487,228 B1 * | 2/2009 | Preslan et al. ............. | 709/219 |

(Continued)

FOREIGN PATENT DOCUMENTS
WO 0150387 A1 7/2001

OTHER PUBLICATIONS

Guleyupoglu, Suleyman ; Ng, Henry, Distributed Collaborative Virtual Reality Framework for System Prototyping and Training, New Information Processing Techniques for Military Systems; Apr. 1, 2001, Naval Research Lab Washington DC.*

(Continued)

Primary Examiner — Daniel Hajnik
(74) Attorney, Agent, or Firm — William E. Schiesser; Hoffman Warnick LLC

(57) ABSTRACT

A system, method, program product and service for implementing a holographic enterprise network. A system for providing an interface between an operations center and a three dimensional (3D) virtual simulator system capable of rendering holographic images of the operations center is disclosed. Included is a holographic enterprise interface having a translation system for translating standard enterprise data associated with the operations center and 3D holographic data. Also enclosed is a communications manager for managing parallel communications between the holographic enterprise interface and a 3D data processing infrastructure having a holographic bus.

20 Claims, 4 Drawing Sheets

U.S. PATENT DOCUMENTS

| | | | |
|---|---|---|---|
| 7,502,854 | B2 | 3/2009 | Luo et al. |
| 7,657,545 | B2 | 2/2010 | Bird |
| 7,681,131 | B1 | 3/2010 | Quarterman et al. |
| 2001/0019328 | A1* | 9/2001 | Schwuttke et al. ............ 345/440 |
| 2001/0051913 | A1 | 12/2001 | Vashistha et al. |
| 2002/0013837 | A1 | 1/2002 | Battat et al. |
| 2002/0113820 | A1 | 8/2002 | Robinson et al. |
| 2002/0134985 | A1 | 9/2002 | Chen et al. |
| 2002/0135610 | A1 | 9/2002 | Ootani et al. |
| 2003/0028269 | A1* | 2/2003 | Spriggs et al. .................. 700/83 |
| 2003/0033402 | A1 | 2/2003 | Battat et al. |
| 2003/0212775 | A1 | 11/2003 | Steele et al. |
| 2004/0120021 | A1 | 6/2004 | Kihara et al. |
| 2005/0027845 | A1 | 2/2005 | Secor et al. |
| 2005/0039132 | A1 | 2/2005 | Germain et al. |
| 2005/0052714 | A1 | 3/2005 | Klug et al. |
| 2005/0162721 | A1 | 7/2005 | Kihara et al. |
| 2005/0183041 | A1 | 8/2005 | Chiu et al. |
| 2006/0090136 | A1 | 4/2006 | Miller et al. |
| 2006/0171538 | A1* | 8/2006 | Larson et al. ................. 380/270 |
| 2006/0248159 | A1 | 11/2006 | Polan |
| 2006/0271563 | A1* | 11/2006 | Angelo et al. ................. 707/100 |
| 2006/0277080 | A1 | 12/2006 | DeMartine et al. |
| 2007/0027973 | A1 | 2/2007 | Stein et al. |
| 2007/0055976 | A1 | 3/2007 | Ward et al. |
| 2007/0067435 | A1 | 3/2007 | Landis et al. |
| 2007/0136788 | A1 | 6/2007 | Monahan et al. |
| 2007/0174777 | A1 | 7/2007 | Finley et al. |
| 2007/0198695 | A1 | 8/2007 | Engelmann et al. |
| 2007/0213956 | A1 | 9/2007 | Nasle et al. |
| 2007/0219645 | A1 | 9/2007 | Thomas et al. |
| 2007/0233839 | A1 | 10/2007 | Gaos |
| 2008/0043760 | A1 | 2/2008 | Venkatraman et al. |
| 2008/0049013 | A1 | 2/2008 | Nasle |
| 2008/0062167 | A1 | 3/2008 | Boggs et al. |
| 2008/0126110 | A1 | 5/2008 | Haeberle et al. |
| 2008/0281912 | A1 | 11/2008 | Dillenberger et al. |
| 2008/0282242 | A1 | 11/2008 | Dillenberger et al. |
| 2010/0083148 | A1 | 4/2010 | Finn et al. |

OTHER PUBLICATIONS

Raskar, R., Welch, G., Cutts, M., Lake, A., Stesin, L., and Fuchs, H. 1998. The office of the future: a unified approach to image-based modeling and spatially immersive displays. In Proceedings of the 25th Annual Conference on Computer Graphics and interactive Techniques SIGGRAPH '98. ACM, New York, NY.*

Hajnik, U.S. Appl. No. 11/747,182, Notice of Allowance & Fees Due, Jul. 16, 2010, 24 pages.

Hajnik, U.S. Appl. No. 11/750,141, Office Action Communication, Sep. 7, 2010, 25 pages.

Dillenberger et al., U.S. Appl. No. 11/747,157, filed May 10, 2007, Office Communication dated Nov. 19, 2009, 18 pages.

Dillenberger et al., U.S. Appl. No. 11/747,157, filed May 10, 2007, Office Communication dated Mar. 25, 2010, 17 pages.

Dillenberger et al., U.S. Appl. No. 11/747,182, filed May 17, 2007, Office Communication dated Dec. 3, 2009, 15 pages.

Dillenberger et al., U.S. Appl. No. 11/747,182, filed May 17, 2007, Notice of Allowance and Fee(s) Due dated Apr. 21, 2010, 17 pages.

Dillenberger et al., U.S. Appl. No. 11/750,216, filed May 17, 2007, Office Communication dated Apr. 5, 2010, 10 pages.

Hajnik, U.S. Appl. No. 11/747,157, Office Action Communication, Dec. 2, 2010, 28 pages.

Wong, U.S. Appl. No. 11/750,216, Office Action Communication, Oct. 1, 2010, 22 pages.

Wang et al., "Integrating Java 3D model and sensor data for remote monitoring and control", Robotics and Computer Integrated Manufacturing 19, 2003, 13-19, 7 pages.

Hajnik, Office Action Communication for U.S. Appl. No. 11/750,1741 dated Jan. 13, 2011, 23 pages.

Wong, U.S. Appl. No. 11/750,216, Office Action Communication, Jul. 6, 2011, 17 pages.

Daniel F. Hajnik, PTO Final Office Action, U.S. Appl. No. 11/747,157, Notification Date Apr. 18, 2011, 19 pages.

Daniel F. Hajnik, PTO Office Action, U.S. Appl. No. 11/750,141, Notification Date Apr. 25, 2011, 19 pages.

Hajnik, U.S. Appl. No. 11/750,141, Notice of Allowance & Fees Due, Sep. 23, 2011, 12 Pages.

Wong, U.S. Appl. No. 11/750,216, Office Action Communication, Dec. 21, 2011, 19 pages.

Hajnik, U.S. Appl. No. 11/747,157, Office Action Communication, Feb. 27, 2012, 28 pages.

Hajnik, U.S. Appl. No. 11/750,141, Notice of Allowance & Fees Due, May 1, 2012, 9 pages.

Hajnik, U.S. Appl. No. 11/747,157, Notice of Allowance & Fees Due, Jun. 14, 2012, 13 pages.

Wong, U.S. Appl. No. 11/750,216, Office Action Communication, Sep. 12, 2012, 24 pages.

* cited by examiner

HOLOGRAPHIC ENTERPRISE NETWORK

FIELD OF THE INVENTION

The invention relates generally to providing three dimensional data, and more particularly to a scalable interface for converting standard enterprise information into holographic data for representing operations centers.

BACKGROUND OF THE INVENTION

As greater demands are placed on operations centers, such as those utilized by information technology providers, utility providers, military and intelligence, service centers, etc., the greater the management challenges become. For instance, a data center, which is used to house mission critical computer systems and associated components (e.g., server hardware, environmental controls, redundant/backup power supplies, redundant data communications connections, high security systems, etc.), may be housed in large buildings covering tens of thousands of square feet. Managing all of the operations of such a facility can be both difficult and costly.

One approach to managing such a facility is to utilize some type of virtual representation of the operations center, which can provide operational information and allow the operator to respond or act accordingly. However, current approaches lack a standardized and scalable interface for converting data back and forth between real world data generated from standard enterprises processes and three dimensional data. Accordingly, a need exists for a standardized interface that addresses the above-mentioned issues.

SUMMARY OF THE INVENTION

The present invention addresses the above-mentioned problems, as well as others, by providing a virtual network operations center to provide an enhanced method of human interaction with systems and processes in an operations center.

In a first aspect, the invention provides computer infrastructure for providing an interface between an operations center and a three dimensional (3D) virtual simulator system capable of rendering holographic images of the operations center, comprising: a holographic enterprise interface having a translation system for translating standard enterprise data associated with the operations center and 3D holographic data; and a communications manager for managing parallel communications between the holographic enterprise interface and a 3D data processing infrastructure having a holographic bus.

In a second aspect, the invention provides a computer program product stored on a computer readable medium, which when executed, provides an interface between an operations center and a three dimensional (3D) virtual simulator system capable of rendering holographic images of the operations center, comprising: means for translating standard enterprise data associated with the operations center and 3D holographic data; and means for managing parallel communications between the holographic enterprise interface and a 3D data processing infrastructure having a holographic bus.

In a third aspect, the invention provides a method for managing an operations center from a three dimensional (3D) virtual simulator system capable of rendering holographic images of the operations center, comprising: generating standard enterprise data from the operations center; providing an interface for translating the standard enterprise data associated with the operations center using a plugin into 3D holographic data; using a parallel communications channel to communicate the 3D holographic data to a 3D data processing infrastructure having a holographic bus; rendering the 3D holographic data on the 3D virtual simulator system; converting inputs obtained in the 3D virtual simulator system into responsive 3D holographic data; using the parallel communications channel to communicate the responsive 3D holographic data via the 3D data processing infrastructure to the interface; translating the responsive 3D holographic data into enterprise data commands; and submitting the enterprise data commands to the operations center.

In a fourth aspect, the invention provides a method for deploying a system for providing an interface between an operations center and a three dimensional (3D) virtual simulator system capable of rendering holographic images of the operations center, comprising: providing a computer infrastructure being operable to: provide an interface to translate standard enterprise data associated with the operations center and 3D holographic data; and manage parallel communications between the interface and a 3D data processing infrastructure having a holographic bus.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
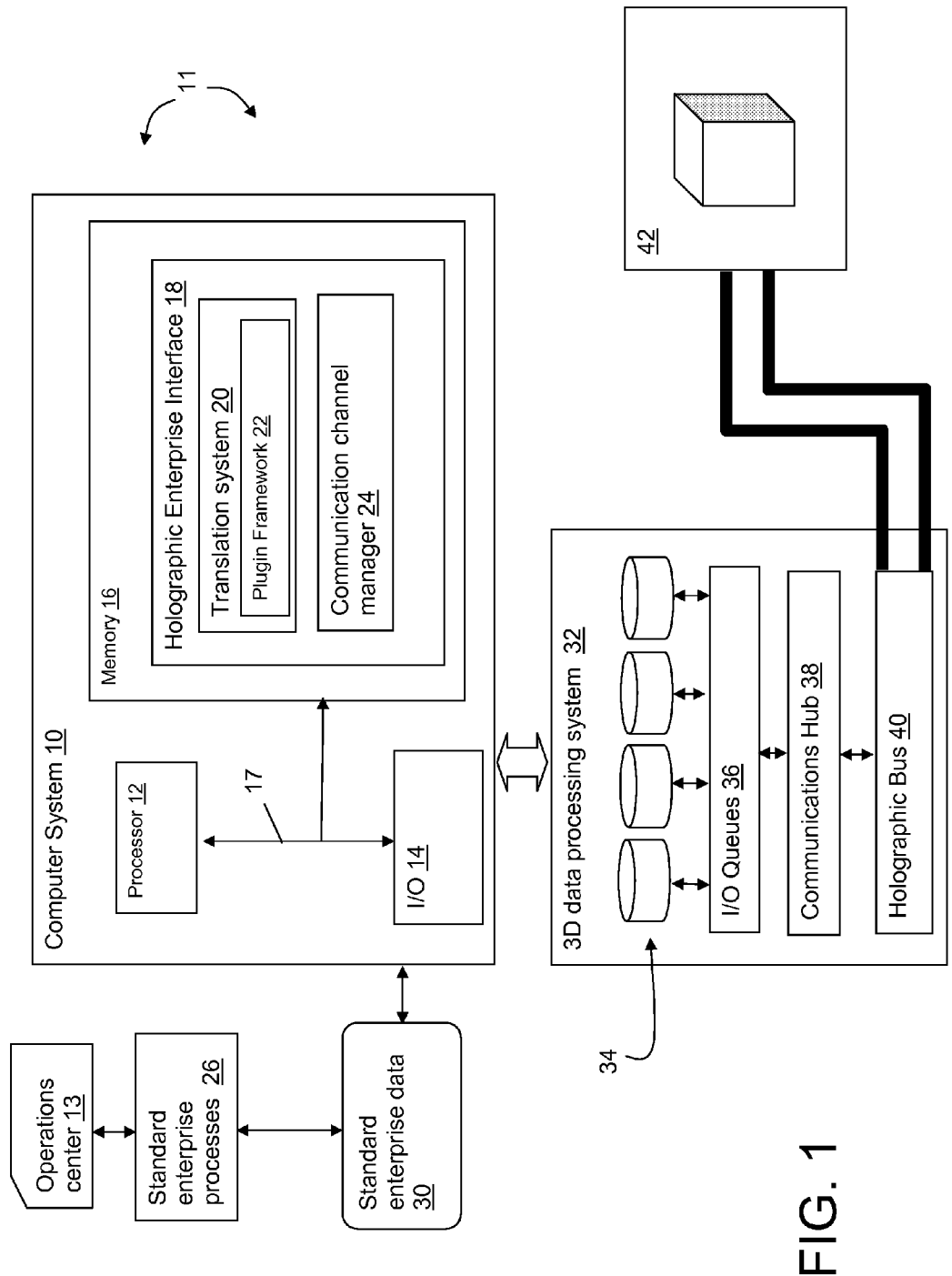
FIG. 1 depicts a computer infrastructure having a holographic enterprise interface in accordance with an embodiment of the present invention.

Referring now to the drawings, FIG. 1 depicts a web portal 10 having an interface infrastructure 11 for converting between (1) standard enterprise data 30 from standard enterprise process 26 and (2) three dimensional (3D) data that can be displayed and manipulated in a 3D virtual simulator system 42. Infrastructure 11 includes a computer system 10 having a holographic enterprise interface 18. Holographic enterprise interface 18 includes a translation system 20 for translating standard enterprise data 30 into a holographic protocol architecture (HPA) format using a plugin framework 22, and vice versa. Communication channel manager 24 implements an underlying transport, XML-RPC, which allows bi-directional communications.

XML-RPC is a remote procedure call protocol which uses XML to encode its calls and HTTP as a transport mechanism. It is a very simple protocol, defining only a handful of data types and commands, and the entire description can be printed on two pages of paper.

In the illustrative embodiment shown in FIG. 1, the standard enterprise processes 26 are associated with an operations center 13, such as a data center. 3D virtual simulator system 42 thus provides a 3D graphical interface that provides a virtual representation of, and interface into, the operations center 13. In particular, data can be passed back and forth in near real-time such that actual operational information can be viewed in the 3D virtual simulator system 42 and operations affecting the operations centers 13 can be implemented via the 3D virtual simulator system 42.

Thus, the holographic enterprise interface 18 connects to back end systems (i.e., standard enterprise processes 26), transforms their native systems management interfaces into the HPA, and manages communications with the virtual world. This includes, e.g., rendering a 3D representation of a data center, its middleware, and processes. Advantages of such a 3d model include immersive interaction with familiar spatial and visual characteristics, the ability for multiple personnel to interact together in the virtual environment despite geographic distances, and many other significant advantages. In addition to providing XML-RPC, communication channel manager 24 can also allow other communication formats to flow back and forth, including, e.g., email, HTTP, binary packets, etc.

As noted, a plugin framework 22 is provided within translation system 20 to allow for ease of use and scalability. Illustrative plugins for processes common to an enterprise environment may include, e.g., eWML, Director, SAP, xcat, WAS, LoadLeveler, etc.

Also shown as part of infrastructure 11 is 3D data processing system 32, which transmits and receives HPA data using XML-RPC to and from holographic enterprise interface 18. Such communications can be local in nature (e.g., with a single computing device) or remote (e.g., over a network, such as the Internet).

3D data processing system 32 includes data channel banks 34, e.g., XML-RPC and email channels, IO queues 36, a communications hub 38, and a holographic bus 40. Data channel banks allow for parallel messaging, the 10 queues 36 manage asynchronous communications, and the communications hub 38 dispatches and routes messages from all channels to the holographic bus 40. The holographic bus 40 then delivers messages to the appropriate rendering infrastructure.

Figure 2:
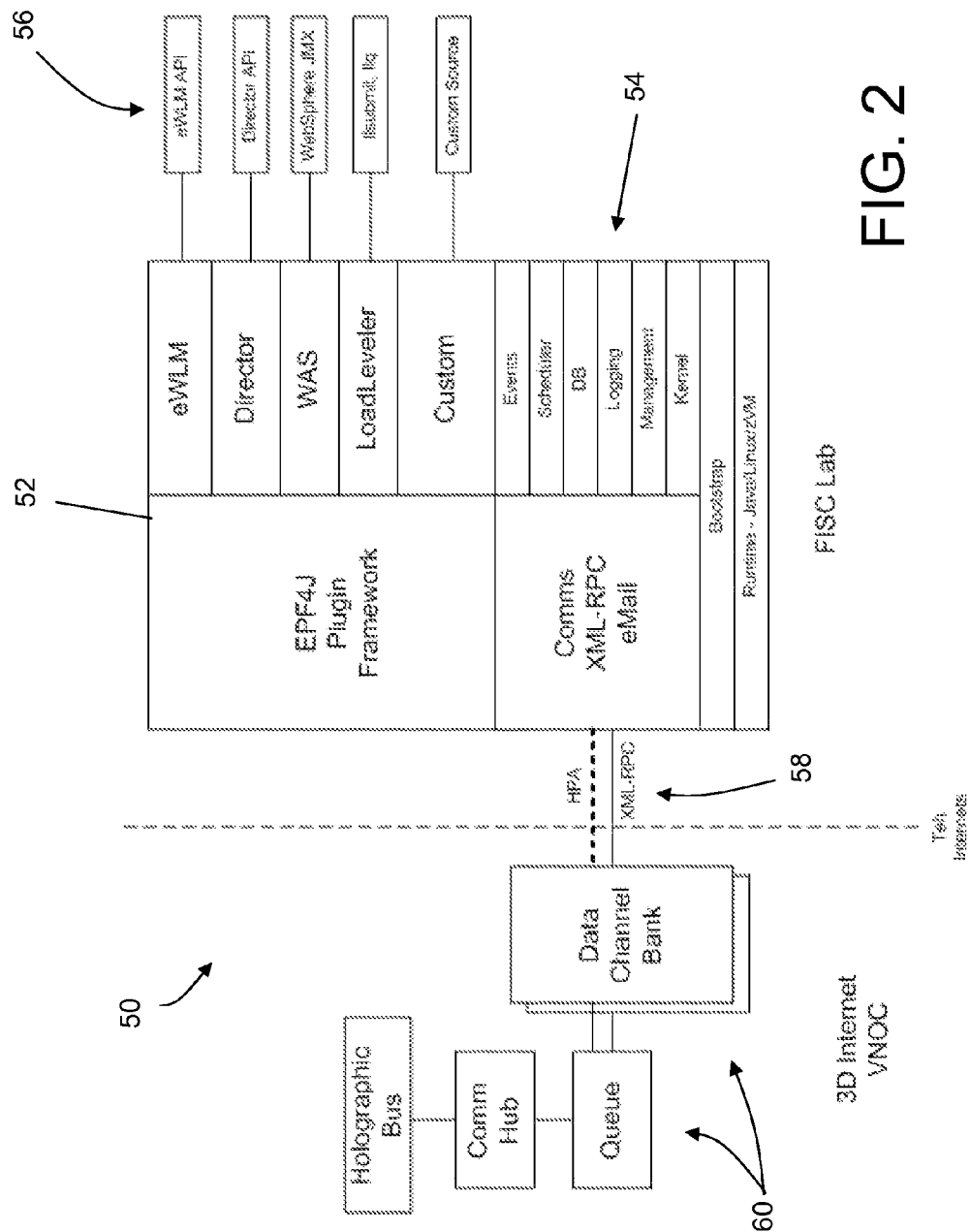
FIG. 2 depicts an architectural view of a holographic enterprise interface in accordance with an embodiment of the present invention.

FIG. 2 depicts an architectural representation 50 of the interface infrastructure 11 of FIG. 1. On the right side of the dotted line is the holographic enterprise interface that includes a plugin framework 52 having various plugins 56 for translating between two dimensional (2D) data and 3D data (i.e., HPA). Also included is a communications framework 54 for managing communications including events, scheduling, database operations, logging, management and kernel operations. As noted communications between 2D environment and the 3D environment occur using HPA and XML-RPC 58.

Figure 3:
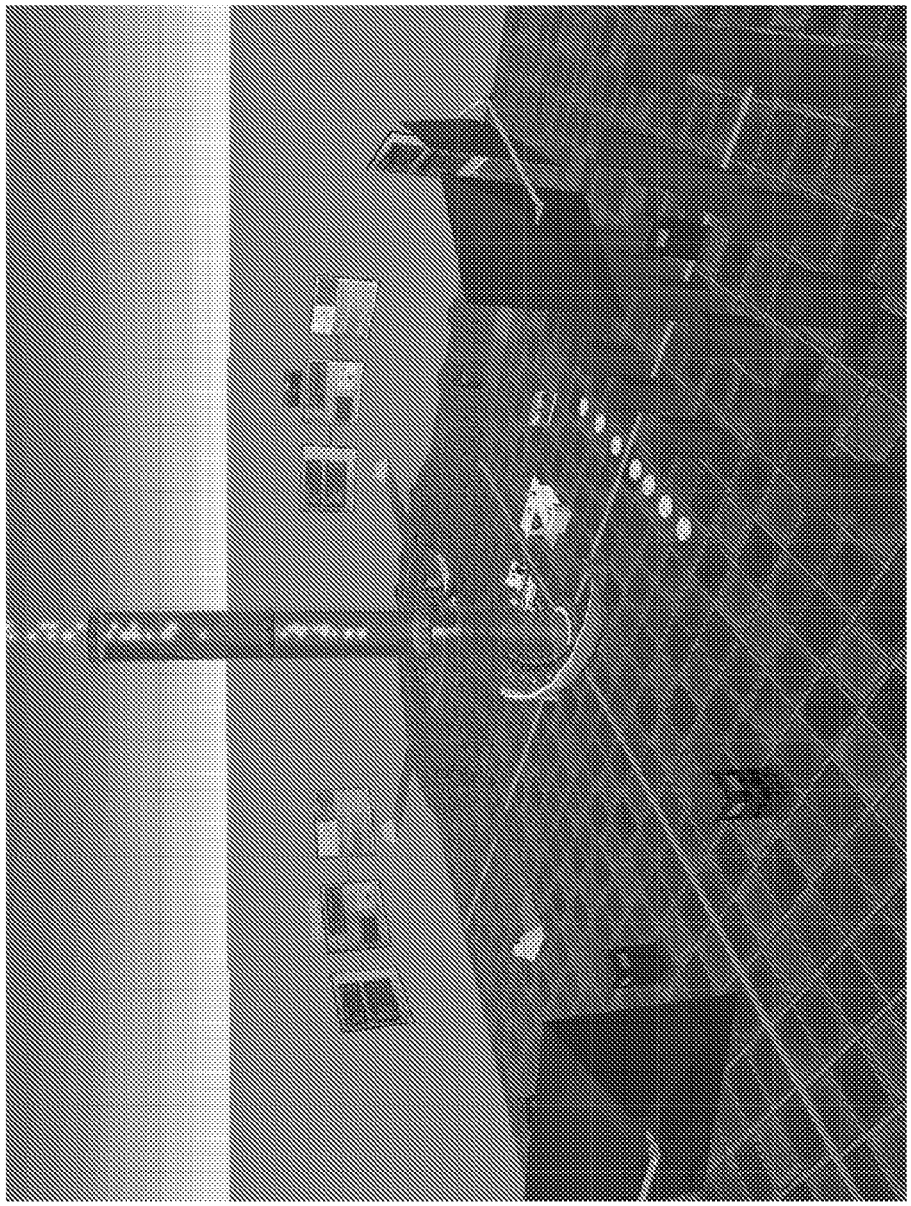
FIGS. 3 and 4 depict illustrative holographic renderings of a data center.
Figure 4:

On the left hand side of FIG. 3 is the 3D infrastructure 60, including a data channel bank for receiving and sending data from and to the 2D infrastructure, a queue, a communication hub, and a holographic bus. FIGS. 3 and 4 depict illustrative renderings of an operations center in a 3D virtual simulator system 42 (FIG. 1).

Referring back to FIG. 1, it is understood that computer system 10 may be implemented using any type of computing device, and may be implemented as part of a client and/or a server. Computer system 10 generally includes a processor 12, input/output (I/O) 14, memory 16, and bus 17. The processor 12 may comprise a single processing unit, or be distributed across one or more processing units in one or more locations, e.g., on a client and server. Memory 16 may comprise any known type of data storage and/or transmission media, including magnetic media, optical media, random access memory (RAM), read-only memory (ROM), a data cache, a data object, etc. Moreover, memory 16 may reside at a single physical location, comprising one or more types of data storage, or be distributed across a plurality of physical systems in various forms.

I/O 14 may comprise any system for exchanging information to/from an external resource. External devices/resources may comprise any known type of external device, including a monitor/display, speakers, storage, another computer system, a hand-held device, keyboard, mouse, voice recognition system, speech output system, printer, facsimile, pager, etc. Bus 17 provides a communication link between each of the components in the computer system 10 and likewise may comprise any known type of transmission link, including electrical, optical, wireless, etc. Although not shown, additional components, such as cache memory, communication systems, system software, etc., may be incorporated into computer system 10.

Access to computer system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment. 3D data processing system 32 and 3D virtual simulator system 42 may likewise be implemented on any type of computer system, such as that described above.

It should be appreciated that the teachings of the present invention could be offered as a business method on a subscription or fee basis. For example, a computer system 10 comprising holographic enterprise interface 18 could be created, maintained and/or deployed by a service provider that offers the functions described herein for customers. That is, a service provider could offer to provide data processing as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A computer infrastructure for providing an interface between an operations center and a three dimensional (3D) virtual simulator system capable of rendering holographic images of the operations center, comprising:
   at least one computing device including:
      a holographic enterprise interface having a translation system for translating standard enterprise data into 3D holographic data associated with the operations center and for directly translating modifications of the 3D holographic data associated with the operations center into standard enterprise data, wherein the 3D holographic data is stored using a holographic protocol architecture (HPA) format, and wherein the standard enterprise data includes actual real world operational data corresponding to native systems management interfaces of standard enterprise processes executing on the operations center and modifications of 3D holographic data corresponding to the standard enterprise processes implement changes to the standard enterprise processes executing on the operations center via the standard enterprise data; and
      a communications manager for managing parallel communications between the holographic enterprise interface and a 3D data processing infrastructure having a holographic bus.

2. The computer infrastructure of claim 1, wherein the operations center comprises a data center.

3. The computer infrastructure of claim 1, wherein the translation system includes a plugin framework.

4. The computer infrastructure of claim 1, wherein the 3D data processing infrastructure further includes a set of data channel banks, a queue, and a communications hub.

5. The computer infrastructure of claim 1, wherein the parallel communications between the holographic enterprise interface and the 3D data processing infrastructure uses a defined protocol and XML remote procedure calls (RPC) for communicating data.

6. The computer infrastructure of claim 1, wherein the parallel communications between the holographic enterprise interface and the 3D data processing infrastructure further includes email.

7. The computer infrastructure of claim 1, wherein the parallel communications support effectuating changes to the operations center via the three dimensional (3D) virtual simulator system.

8. A computer program product stored on a non-transitory computer readable storage medium, which when executed, provides an interface between an operations center and a three dimensional (3D) virtual simulator system capable of rendering holographic images of the operations center by performing a method comprising:
   translating standard enterprise data into 3D holographic data associated with the operations center;
   directly translating modifications of the 3D holographic data associated with the operations center into standard enterprise data, wherein the 3D holographic data is stored using a holographic protocol architecture (HPA) format, and wherein the standard enterprise data includes actual real world operational data corresponding to native systems management interfaces of standard enterprise processes executing on the operations center and modifications of 3D holographic data corresponding to the standard enterprise processes implement changes to the standard enterprise processes executing on the operations center via the standard enterprise data; and
   managing parallel communications between the holographic enterprise interface and a 3D data processing infrastructure having a holographic bus.

9. The computer program product of claim 8, wherein the operations center comprises a data center.

10. The computer program product of claim 8, wherein the translating uses a plugin framework.

11. The computer program product of claim 8, wherein the 3D data processing infrastructure further includes a set of data channel banks, a queue, and a communications hub.

12. The computer program product of claim 8, wherein the parallel communications between the holographic enterprise interface and the 3D data processing infrastructure uses a defined protocol and XML remote procedure calls (RPC) for communicating data.

13. The computer program product of claim 8, wherein the parallel communications between the holographic enterprise interface and the 3D data processing infrastructure further includes email.

14. The computer program product of claim 8, wherein the parallel communications support effectuating changes to the operations center via the three dimensional (3D) virtual simulator system.

15. A method for managing an operations center from a three dimensional (3D) virtual simulator system capable of rendering holographic images of the operations center, comprising:
   providing an interface for translating standard enterprise data associated with the operations center into 3D holographic data associated with the operations center and for directly translating modifications of the 3D holographic data associated with the operations center into standard enterprise data using a plugin, wherein the 3D holographic data is stored using a holographic protocol architecture (HPA) format, and wherein the standard enterprise data includes actual real world operational data corresponding to native systems management interfaces of standard enterprise processes executing on the operations center and modifications of 3D holographic data corresponding to the standard enterprise processes implement changes to the standard enterprise processes executing on the operations center via the standard enterprise data;
   using a parallel communications channel to communicate the 3D holographic data to a 3D data processing infrastructure having a holographic bus;
   rendering the 3D holographic data on the 3D virtual simulator system;
   converting inputs obtained in the 3D virtual simulator system into responsive 3D holographic data;
   using the parallel communications channel to communicate the responsive 3D holographic data via the 3D data processing infrastructure to the interface;
   translating the responsive 3D holographic data into enterprise data commands; and
   submitting the enterprise data commands for processing by the operations center.

16. The method of claim 15, wherein the operations center comprises a data center.

17. The method of claim 15, wherein the 3D data processing infrastructure further includes a set of data channel banks, a queue, and a communications hub.

18. The method of claim 15, wherein the parallel communications between the interface and the 3D data processing infrastructure uses a defined protocol and XML remote procedure calls (RPC) for communicating data.

19. The method of claim 15, wherein the parallel communications between the holographic enterprise interface and the 3D data processing infrastructure further includes email.

20. A method for deploying a system for providing an interface between an operations center and a three dimensional (3D) virtual simulator system capable of rendering holographic images of the operations center, comprising:
 providing a computer infrastructure being operable to:
  provide an interface to translate standard enterprise data into 3D holographic data associated with the operations center and for directly translating modifications of the 3D holographic data associated with the operations center into standard enterprise data, wherein the 3D holographic data is stored using a holographic protocol architecture (HPA) format, and wherein the standard enterprise data includes actual real world operational data corresponding to native systems management interfaces of standard enterprise processes executing on the operations center and modifications of 3D holographic data corresponding to the standard enterprise processes implement changes to the standard enterprise processes executing on the operations center via the standard enterprise data; and
 manage parallel communications between the interface and a 3D data processing infrastructure having a holographic bus.

* * * * *